Patented Oct. 9, 1951

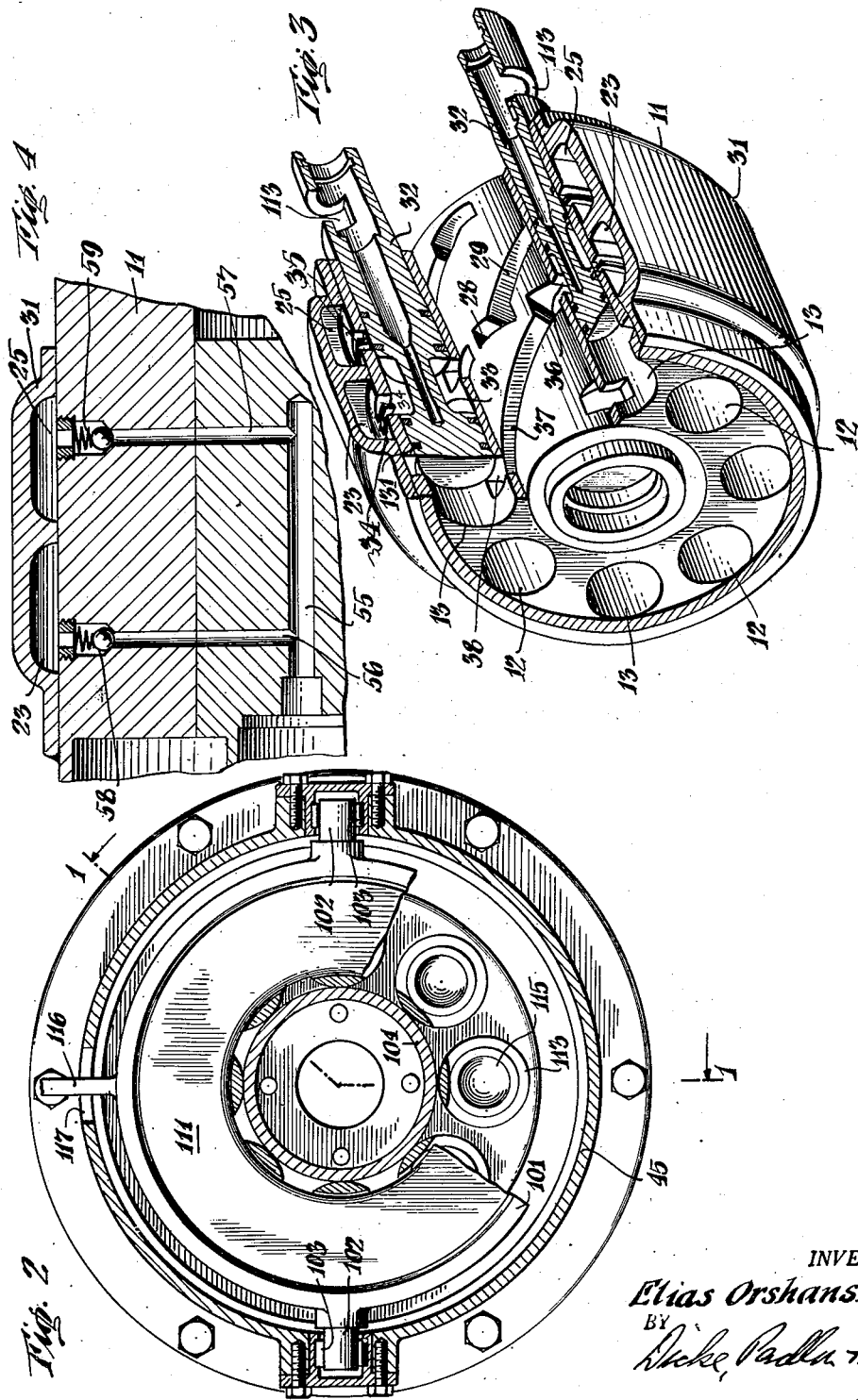

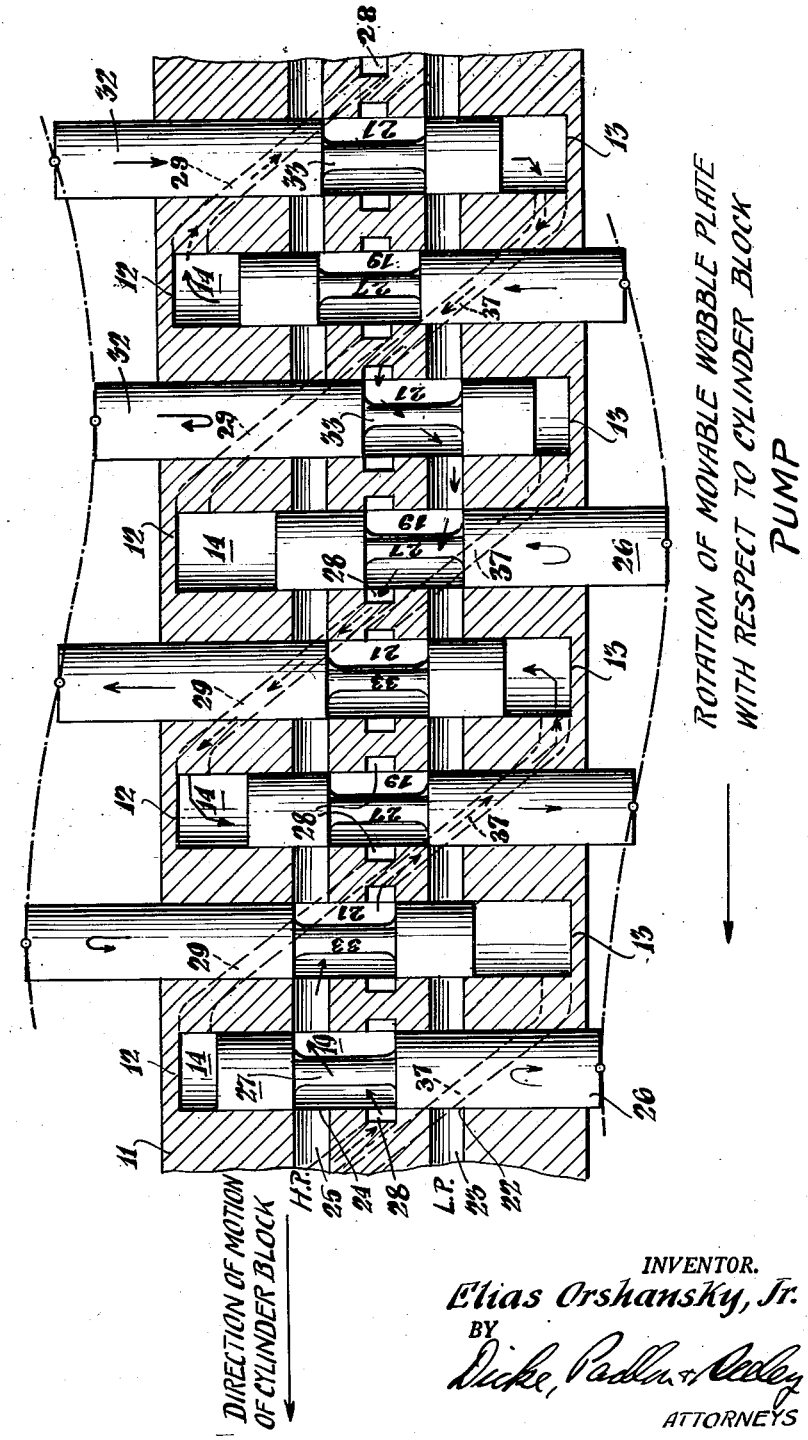

2,570,843

UNITED STATES PATENT OFFICE 2,570,843

HYDRAULIC TRANSMISSION

Elias Orshansky, Jr., Stamford, Conn., assignor to The Acrotorque Company, Stamford, Conn., a corporation of Connecticut Application August 8, 1947, Serial No. 767,605

5 Claims. (Cl. 60—53)

This invention relates to hydraulic transmissions or torque converters for use in the transmission of power from a prime mover to a driven mechanism. One such use is in driving the traction elements of a motor vehicle, tractor, locomotive or the like. Another is in driving the electric generator or other apparatus on a railroad car from a car axle, and many other uses will be apparent to those skilled in the art.

An object of this invention is to provide an improved hydraulic torque converter constructed and arranged to operate efficiently on either direction of rotation of the input shaft.

A further object is to provide a simplified construction of hydraulic torque converter of the positive displacement type in which valving of the cylinders is accomplished without requiring the provision of movable members outside of the cylinder block for valving purposes.

A still further object is to provide an hydraulic torque converter constructed and arranged to permit neutral operation of an input shaft without circulating the working fluid.

A still further object is to provide an hydraulic torque converter capable of selectively permitting free rotation of the output shaft or locking of the output shaft against rotation as a result of torque applied to it from external sources.

A still further object is to provide an hydraulic torque converter of the positive displacement type having a self-contained cylinder block of such construction that the entire body of working fluid is segregated within the cylinder block and maintained separate from any fluid used for lubrication or other purposes.

An illustrative embodiment disclosing one form of the invention is shown in the accompanying drawing in which Fig. 1 is a longitudinal sectional view on the line 1—1 of Fig. 2 through a torque converter constructed in accordance with one embodiment of this invention, parts being omitted for clarity of illustration.

Fig. 2 is a section on line 2—2 of Fig. 1.

Fig. 3 is a perspective view, partially broken away, showing the cylinder block construction with the self-contained manifolds and fluid pressure passages therein.

Fig. 4 is a sectional view illustrative of a detail and,

Fig. 5 is a sectional diagram of the cylinder block and associated pistons illustrating the valving operation.

Figure 1:
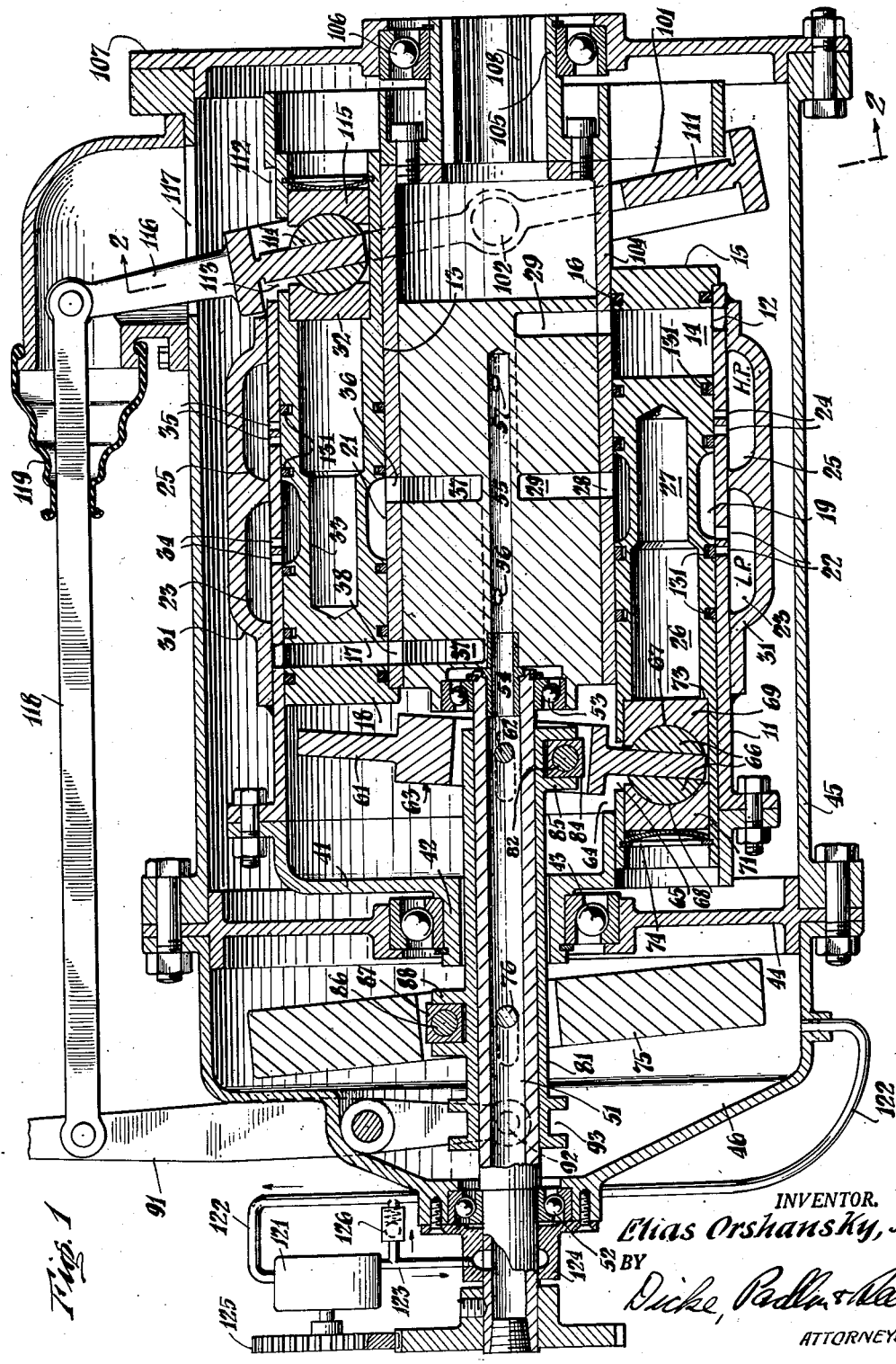

In the illustrative embodiment of the present invention a cylinder block having both pump and motor cylinders and pistons, is arranged with self-contained high and low pressure manifolds, each of which is adapted for connection to the pressure chamber of each pump cylinder through a valve chamber provided in another pump cylinder the location and therefore the operation of which is 90° out of phase with the said first mentioned pump cylinder; and also to the pressure chamber of each motor cylinder through a valve chamber provided in another motor cylinder the location and therefore the operation of which is 90° out of phase with the said first mentioned motor cylinder. The body portion of each piston is shaped to form a spool type valve body for controlling the valving in the associated cylinder. An input shaft has a suitably adjustable eccentric mechanism for operating the pump pistons, which in turn, through the transmission of fluid pressure, drive the motor pistons. An adjustable eccentric mechanism is associated with the reciprocating motor pistons to produce rotation of the output shaft. As a result of controlling the valving of the various cylinders by the reciprocation of the working pistons themselves, and the provision of the manifolds and pressure passages within the cylinder block, a self-contained unit is provided in which the working fluid is entirely contained within the cylinders and pressure passages and is segregated from the lubricating or other fluid.

The provision of adjustable means both for actuating the pump pistons from the input shaft and operating the output shaft from the motor pistons, not only provides a torque converter in which the input shaft can be placed in neutral so as to transmit no torque, without circulating any of the working fluid, but also provides an hydraulic lock in the motor cylinders which serves to lock the input and output shafts together for direct drive.

The drawing shows the invention applied to a transmission or torque converter of the wobble disk type having pump and motor cylinders alternately arranged in a circular series surrounding and parallel to the axes of the input and output shafts. In order to simplify the disclosure, the illustrated embodiment comprises four pump cylinders 12, spaced 90° apart, and four motor cylinders 13 also spaced 90° apart. Each cylinder is formed by a bore extending entirely through the cylinder block, the pump cylinder bores opening toward the input shaft at the left in Fig. 1, and the motor cylinder bores opening toward the output shaft at the right in the same figure. The pressure chamber 14 of each pump cylinder 12 is closed by a suitable cylinder head 15 secured in the end of the cylinder in any desired manner, a sealing ring 16 being provided. Likewise, pressure chamber 17 of each motor cylinder 13 is closed by a similar head 18 and an associated sealing ring. Each pump cylinder 12 has a valve chamber 19 formed centrally thereof. Likewise each motor cylinder has a valve chamber 21 formed centrally thereof.

In Fig. 1, it will be apparent that one pump cylinder and piston and one motor cylinder and piston only are shown, the ends of the additional pistons being omitted in order to simplify the view.

The valve chamber 19 of each pump cylinder is adapted to connect through a port or ports 22 with a low pressure manifold 23 formed within the cylinder block, and through a port or ports 24 with a high pressure manifold 25 formed within the cylinder block. Each pump piston 26, illustrated as of hollow construction, has a spool-shaped body portion 27 forming a valve body for controlling the supply of low pressure fluid and the delivery of high pressure fluid to and from the associated pump cylinder, the operation of which is 90° out of phase. For this purpose, valve chamber 19 of each pump cylinder communicates through a port or ports 28 with a fluid pressure passage 29, see Figs. 1, 3, and 5, formed in the cylinder block and leading to the pressure chamber 14 of the associated pump cylinder, the operation of which is 90° out of phase. In this way the valving of each pump cylinder is controlled by the reciprocation of the pump piston in another pump cylinder which is 90° out of phase. In the illustrated embodiment the difference in phasing is obtained by the 90° spacing of the respective cylinders around the axis of the associated input or pump shaft.

For convenience in manufacture, the low and high pressure manifolds 23 and 25 are shown as formed in a separate muff 31 surrounding the cylinder block 11 and welded or otherwise secured thereto.

Each motor piston 32, like the pump pistons, is preferably of hollow construction and has a spool-shaped body portion 33 for controlling the valving of an associated motor cylinders. The valve chamber 21 of each motor cylinder is connected by a port or ports 34 with the low pressure manifold 23 and by a port or ports 35 with the high pressure manifold 25, and also communicates through a port or ports 36 with a fluid passage 37 formed in the cylinder block and connecting through a port or ports 38 with the pressure chamber portion of another motor cylinder 90° away, the operation of which is therefore 90° out of phase. As a result, the valving of each motor cylinder is accomplished by the reciprocation of the piston in another motor cylinder 90° away, so that the proper timing is accomplished as the second mentioned piston is 90° out of phase with the piston it valves. In the illustrated embodiment the difference in phasing is accomplished by the 90° spacing of the motor cylinders around the output or motor shaft.

As illustrated, the pump end of the cylinder block 11 is formed by a plate 41 bolted to the main block and having an axial collar 42 rotatably mounted in an anti-friction bearing 43 supported in a spider 44, which is in turn mounted within an outer casing 45 having an end plate 46 secured thereto, the casing 45 and plate 46 forming part of a sump for the oil.

A hollow input or pump shaft 51 is supported in and extends through an anti-friction bearing 52 in the end plate 46, and the inner end of the pump shaft is supported in the anti-friction bearing 53 in the cylinder block 11. The hollow pump shaft connects through a coupling 54 with a bore 55 in the cylinder block, see Figs. 1 and 4. The latter bore in turn connects with the low and high pressure manifolds through bores 56 and 57 controlled by check valves 58 and 59.

The pump pistons are reciprocated from the pump shaft by a suitable eccentric mechanism such as the wobble plate 61 pivotally mounted on a pin 62 extending diametrically through the pump shaft and through the hub 63 of the wobble plate. The edge of the wobble plate extends through slots 64 in each pump cylinder wall and slots 65 in each pump piston and is located between wear members 66 located on opposite sides of the wobble disk in pockets 67 formed in cup-shaped retainers 69 and 71, respectively. The retainer 69 is positioned in a suitable recess in the pump piston and bears against a shoulder 73, see Fig. 1, while the opposite retainer 71 is held in place by a resilient washer 74, or the like, suitably mounted in the hollow end of the pump piston. A counterbalance 75 is pivotally mounted on the pump shaft on a pin 76 extending therethrough. In order to provide fixed dimensions and maintain fixed relations between the pistons and the wobble plate, in spite of variations in the wobble plate angle, the wear members and associated driving parts are formed as described in my co-pending application Serial Number 768,891 filed August 15, 1947, now abandoned.

The piston stroke of the pump is adjusted by varying the angular position of the wobble disk 61 on the pump shaft. As illustrated, this is accomplished by a sleeve 81 which is slidably supported on the pump shaft for rotation therewith and extends through the hubs of both the wobble disk 61 and the counterbalance 75. The sleeve is longitudinally movable along the shaft and is pivotally connected to the wobble disk hub 63 by a pin 82 pivoted to the hub and rotatably supported in a pin block 84 secured between flanges 85 formed on the sleeve within the wobble disk hub. Likewise, the adjusting sleeve is connected to the counterbalance by a pin 86 pivoted to the counterbalance and rotatably mounted in a pin block 87 located between flanges 88 on the adjacent sleeve. The sleeve 81 is movable longitudinally of the pump shaft by a pump stroke adjusting lever 91 which is shown as pivoted to the end plate 46 of the casing and provided with a pin 92 seated in a groove 93 formed in the sleeve. The sleeve 81 is slotted opposite pins 76 and 62 to permit longitudinal movement thereof.

It will, of course, be understood that rotation of the driving shaft and the wobble disk 61 relative to the cylinder block reciprocates the pump pistons in the pump cylinders.

A non-rotatable, preferably angularly adjustable motor wobble plate 101 is pivotally supported in the casing 45 on trunnions 102 mounted in anti-friction bearings 103 in the casing. The motor wobble plate 101 is of annular construction, surrounding a sleeve extension 104 of the cylinder block. The extension 104 is connected to a hollow shaft 105 rotatably supported in anti-friction bearings 106 in an end plate 107 of the housing, and provided with splines 108 or the like for connection to any suitable output shaft.

The wobble plate 101 has an inwardly extending annular flange 111 extending through slots 112 in the cylinder block and slots 113 in the outer walls of the motor pistons and between hemispherical wear members 114 positioned in cup-shaped retainers 115 which are secured in the motor pistons in a manner similar to the corresponding retainers in the pump pistons. The non-rotatable motor wobble plate 101 is angularly adjustable by means of an arm 116 extending through a slot 117 in the casing 45 and having an actuating link 118 projecting outwardly through a flexible sealing boot 119. As illustrated, the link 118 is connected to the control lever 91 so that the stroke of the pump pistons can be varied simultaneously with that of the motor pistons. When connected in the manner shown in Fig. 1 it will be apparent that movement of the control lever 91 to increase the stroke of the pump pistons will result in decrease of the stroke of the motor pistons and vice versa.

It is usually desirable to supercharge the low pressure manifold 23 so as to maintain a predetermined minimum pressure therein and to return leakage oil to the system. In the present invention this is accomplished by means of a supercharger or pump 121, see Fig. 1, which draws fluid through a line 122 from the sump within the casing 45 and delivers it through a line 123 and connecting collar 124 to the interior of the pump shaft 51 from which it is conveyed through the cylinder bore 55 and radial passage 56 and check valve 58 to the low pressure manifold 23 (Fig. 4). On torque reversal, it will be apparent that the high pressure manifold 25 becomes the low pressure manifold and will be supercharged through the radial passage 57 and check valve 59. The supercharger is driven by suitable gearing 125 from the pump or input shaft and the pressure maintained by the supercharger is controlled by the setting of a check relief valve 126 which exhausts excess pressure to the supply line 122.

In order to avoid the necessity of lapped fits between the pistons and the cylinders, the present invention provides a pair of sealing rings 131 on each piston at each side of the spool type body portion. The various ports 22, 24, 34, 35, past which one or the other ring operates are sufficiently narrow circumferentially to prevent the rings catching on the port edges. If more port area is required than is provided by a single opening, then a series of port openings is provided.

In operation, the pump shaft 51 rotates the wobble disk 61 relatively to the cylinder block and operates the pump pistons 26, each piston controlling the valving of another pump cylinder 90° out of phase. The resulting circulation of fluid pressure through the high and low pressure manifolds actuates the motor pistons 32, assuming that the motor pistons are not at zero stroke. As with the pump pistons, each motor piston controls the valving of a separate motor cylinder 90° out of phase. The non-rotatable motor wobble disk 101 forms a reaction point for the motor pistons resulting in rotation of the cylinder block 11 and the output shaft 105 through the reciprocation of the motor pistons. For low torque, high speed operation the control lever 91 is so positioned that the pump wobble plate 61 is at maximum angle. Under these conditions, when the motor adjusting link 118 is connected to the control lever 91 the position of the control lever is such as to position the motor wobble plate 101 at right angles to the axis of the output shaft. This sets the motor pistons at zero stroke and results in an hydraulic lock preventing the flow of oil through the cylinders and manifolds, in turn locking the pump pistons against reciprocation in the pump cylinders since there is no circuit through which the pump pistons can deliver oil, so that the cylinder block and output shaft 105 are caused to rotate at the same speed as the input or pump shaft 51. In other words, with the motor pistons held at zero stroke direct drive results.

The other extreme of operation occurs when the control lever 91 is so positioned that the pump wobble disk 61 is at right angles to the input shaft 51 so as to produce no reciprocation of the pump pistons 26. This places the mechanism in neutral, permitting rotation of the input shaft without transmitting any drive to the output shaft. In the illustrated embodiment when the pump wobble plate 61 is in neutral the motor wobble plate 101 is at an angle resulting in locking the output shaft 105 against rotation.

It will be apparent that the invention provides a unit which is fully reversible, that is, torque can be transmitted from the shaft 105 to the shaft 51, or the direction of rotation of the input shaft 51 can be reversed to reverse the direction of the output shaft 105, or the direction of the operation of the output shaft with relation to the input shaft can be reversed, resulting in reversal of the high and low pressure manifolds, and reversal of the direction of rotation of the output shaft by changing the angular phasing of the wobble plates 180° with respect to each other. In order to do this it will be apparent that a different control linkage than that illustrated will be required. When this is done, the high pressure manifold 25 becomes the low pressure manifold and the supercharger operates to maintain the predetermined minimum pressure therein through the passage 57 and check valve 59.

It will be apparent that the working fluid is entirely self-contained within the pump and motor cylinders, the manifolds and fluid passages of the cylinder block 11 at all times being segregated from fluid used for any other purpose, such as lubrication. This permits supercharging the low pressure manifold to the desired degree and forestalls emulsification of the working fluid during operation of the device.

The detailed construction of the cylinder block can, of course, be varied as desired and, although the invention has been exemplified in the present disclosure by a wobble plate type of mechanism, it will be apparent that its advantageous features can also be incorporated in other types of torque converters employing other forms of adjustable eccentric means connecting the pump and motor pistons to the input and output shafts. The invention is not intended to be limited to the form shown, which is illustrative only, and it is intended that the patent shall cover by suitable expression in the appended claims whatever features of patentable novelty exist in the invention disclosed.

I claim:

1. The combination in an hydraulic transmission of a housing, a rotatable cylinder block in said housing having four parallel pump and four parallel motor cylinder bores therein, the pump cylinders being open at one end of the block and the motor cylinders being open at the other end of the block, so that the pressure chambers in said pump and motor cylinders are located on opposite ends of said block, each cylinder having a valve chamber substantially centrally thereof, high and low pressure manifolds in said block having ports communicating with the valve chamber of each of said cylinders, pistons in each cylinder having spool type valve body portions reciprocable relative to said ports, passages in said block connecting the pressure chamber in each pump cylinder with the valve chamber in an adjacent pump cylinder, whereby the valving of each pump pressure chamber relative to the high and low pressure manifolds is controlled by the reciprocation of the pump piston in said adjacent pump cylinder, passages in said block connecting the pressure chamber in each motor cylinder with the valve chamber in an adjacent motor cylinder, whereby the valving of each motor pressure chamber relative to the high and low pressure manifolds is controlled by the reciprocation of the motor piston in the adjacent motor cylinder, and whereby the entire supply of working fluid for said unit is contained within said cylinder block, an input shaft, means actuated by rotation of said input shaft relative to said block for reciprocating said pump pistons, including adjustable mechanism for adjusting the pump piston stroke from substantially zero to a maximum, an output shaft connected for rotation with said rotatable cylinder block and means actuated in accordance with rotation of said cylinder block relative to said housing for reciprocating said motor pistons in their cylinders, including adjustable mechanism for adjusting the motor piston stroke from a maximum to substantially zero.

2. The hydraulic transmission according to claim 1 in which the cylinder block comprises a tubular member in which the pump and motor cylinders are formed including the ports connecting the high and low pressure manifolds with the valve spaces in the cylinders and including inwardly extending ports communicating with the valve spaces of the respective cylinders and inwardly extending ports communicating with the pressure spaces of the respective cylinders; a second tubular member surrounding the first mentioned tubular member and formed with annular high and low pressure manifolds connecting respectively with the first mentioned ports; and a cylindrical member fitted within said first tubular member and formed with passages connecting the second mentioned port of each pump cylinder in the first mentioned tubular member with the pressure space port of the adjacent pump cylinder and also formed with passages connecting the second mentioned ports of each motor cylinder in the first mentioned tubular member with the pressure space port of the adjacent motor cylinder.

3. An hydraulic transmission according to claim 1 together with means interconnecting the means for adjusting the pump piston strokes and the means for adjusting the motor piston strokes so constructed and arranged that when the strokes of one set of pistons is increased the strokes of the other set of pistons is decreased.

4. An hydraulic transmission according to claim 1 having a pump driven by the input shaft, a conduit from the bottom of said housing to the intake side of said pump and a conduit from the delivery side of said pump leading to the low pressure manifold through a check-valve and having a branch conduit which leads to the high pressure manifold through another check-valve.

5. The hydraulic transmission according to claim 1 in which the cylinder block comprises a plurality of telescopically assembled members in one of which the pump and motor cylinders are formed including ports connecting the high and low pressure manifolds with the valve spaces in the cylinders and including ports communicating with the valve spaces of the respective cylinders and ports communicating with the pressure spaces of the respective cylinders, and the various passages connecting said ports are formed in one or more of the abutting surfaces of said members before said members are assembled.

ELIAS ORSHANSKY, Jr.

REFERENCES CITED

The following references are of record in the file of this patent:

UNITED STATES PATENTS

| Number | Name | Date |
|---|---|---|
| 1,906,726 | Thompson | May 2, 1933 |
| 2,151,415 | Bennetch | Mar. 21, 1939 |
| 2,199,081 | Perin | Apr. 30, 1940 |